US008329967B2

(12) United States Patent
Brandvold et al.

(10) Patent No.: US 8,329,967 B2
(45) Date of Patent: *Dec. 11, 2012

(54) PRODUCTION OF BLENDED FUEL FROM RENEWABLE FEEDSTOCKS

(75) Inventors: Timothy A. Brandvold, Arlington Heights, IL (US); Michael J. McCall, Geneva, IL (US)

(73) Assignee: UOP LLC, Des Plaines, IL (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/418,963

(22) Filed: Apr. 6, 2009

(65) Prior Publication Data

US 2009/0301930 A1 Dec. 10, 2009

Related U.S. Application Data

(60) Provisional application No. 61/042,747, filed on Apr. 6, 2008.

(51) Int. Cl.
*C10L 1/04* (2006.01)
*C07C 1/20* (2006.01)

(52) U.S. Cl. ............. 585/240; 585/14; 208/15; 208/16; 208/17

(58) Field of Classification Search .................. 585/240
See application file for complete search history.

(56) References Cited

U.S. PATENT DOCUMENTS

| 4,115,246 | A | 9/1978 | Sweany |
| 4,795,841 | A | 1/1989 | Elliott et al. |
| 4,997,548 | A | 3/1991 | Rantell et al. |
| 5,180,868 | A | 1/1993 | Baker et al. |
| 5,186,722 | A | 2/1993 | Cantrell et al. |
| 5,705,722 | A | 1/1998 | Monnier et al. |
| 7,232,935 | B2 | 6/2007 | Jakkula et al. |
| 7,279,018 | B2 | 10/2007 | Jakkula et al. |
| 7,425,657 | B1 | 9/2008 | Elliott et al. |
| 7,459,597 | B2 | 12/2008 | Koivusalmi et al. |
| 7,491,858 | B2 | 2/2009 | Murzin et al. |
| 7,500,997 | B2 | 3/2009 | Norbeck et al. |
| 7,501,546 | B2 | 3/2009 | Koivusalmi et al. |
| 7,511,181 | B2 * | 3/2009 | Petri et al. .................... 585/240 |
| 7,540,952 | B2 | 6/2009 | Pinho et al. |
| 7,578,927 | B2 * | 8/2009 | Marker et al. .................. 208/67 |

(Continued)

FOREIGN PATENT DOCUMENTS

CN 11270300 A 9/2008

(Continued)

OTHER PUBLICATIONS

Baker, et al. "Catalytic Upgrading of Biomass Pyrolysis Oils" Pacific Northwest Laboratory, Richland, Washington, USA, pp. 883-895.

(Continued)

*Primary Examiner* — Ellen McAvoy
(74) *Attorney, Agent, or Firm* — Maryann Maas

(57) ABSTRACT

A process for producing a blended fuel from a paraffin rich component and a cyclic rich component, where each of the components are generated from a renewable feedstock, is presented. The paraffin rich component is generated from glycerides and free fatty acids in feedstocks such as plant and animal oils. The cyclic rich component is generated from biomass derived pyrolysis oil. The source of the animal or plant oil and the biomass may be the same renewable source.

26 Claims, 3 Drawing Sheets

U.S. PATENT DOCUMENTS

| | | | |
|---|---|---|---|
| 7,928,273 B2* | 4/2011 | Bradin | 585/14 |
| 2006/0186020 A1 | 8/2006 | Gomes | |
| 2006/0207166 A1 | 9/2006 | Herskowitz et al. | |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |
| 2007/0161832 A1 | 7/2007 | Myllyoja et al. | |
| 2007/0170091 A1 | 7/2007 | Monnier et al. | |
| 2007/0175795 A1 | 8/2007 | Yao et al. | |
| 2007/0260102 A1 | 11/2007 | Duarte Santiago et al. | |
| 2007/0281875 A1 | 12/2007 | Scheibel et al. | |
| 2007/0287873 A1 | 12/2007 | Coupard et al. | |
| 2007/0299291 A1 | 12/2007 | Koivusalmi | |
| 2008/0025903 A1 | 1/2008 | Cortright | |
| 2008/0033188 A1 | 2/2008 | Dumesic et al. | |
| 2008/0045731 A1 | 2/2008 | Zhang | |
| 2008/0050792 A1 | 2/2008 | Zmierczak et al. | |
| 2008/0052983 A1 | 3/2008 | Aulich et al. | |
| 2008/0066374 A1 | 3/2008 | Herskowitz | |
| 2008/0076945 A1 | 3/2008 | Marker et al. | |
| 2008/0092436 A1 | 4/2008 | Seames et al. | |
| 2008/0132435 A1 | 6/2008 | Ferreira Fontes et al. | |
| 2008/0156694 A1 | 7/2008 | Chapus et al. | |
| 2008/0161614 A1 | 7/2008 | Bertoncini et al. | |
| 2008/0161615 A1 | 7/2008 | Chapus et al. | |
| 2008/0163543 A1 | 7/2008 | Abhari et al. | |
| 2008/0173570 A1 | 7/2008 | Marchand et al. | |
| 2008/0216391 A1 | 9/2008 | Cortright et al. | |
| 2008/0229654 A1 | 9/2008 | Bradin | |
| 2008/0244962 A1 | 10/2008 | Abhari et al. | |
| 2008/0281134 A1 | 11/2008 | Ghonasgi et al. | |
| 2008/0300434 A1 | 12/2008 | Cortright et al. | |
| 2008/0300435 A1 | 12/2008 | Cortright et al. | |
| 2008/0302001 A1 | 12/2008 | Koivusalmi et al. | |
| 2008/0308457 A1 | 12/2008 | Dindi et al. | |
| 2008/0308458 A1 | 12/2008 | Dindi et al. | |
| 2008/0312480 A1 | 12/2008 | Dindi et al. | |
| 2008/0313955 A1 | 12/2008 | Silva et al. | |
| 2009/0000185 A1* | 1/2009 | Aulich et al. | 44/308 |
| 2009/0014354 A1 | 1/2009 | Knuuttila et al. | |
| 2009/0019763 A1 | 1/2009 | Ghonasgi et al. | |
| 2009/0029427 A1 | 1/2009 | Miller | |
| 2009/0031617 A1 | 2/2009 | O'Rear | |
| 2009/0062578 A1 | 3/2009 | Koivusalmi et al. | |
| 2009/0069610 A1 | 3/2009 | Roberts, IV et al. | |
| 2009/0071872 A1 | 3/2009 | Ginosar et al. | |
| 2009/0077866 A1 | 3/2009 | Kalnes et al. | |
| 2009/0082603 A1* | 3/2009 | Kalnes et al. | 585/240 |
| 2009/0082606 A1 | 3/2009 | Marker et al. | |
| 2009/0084026 A1 | 4/2009 | Miller | |
| 2009/0088351 A1 | 4/2009 | Miller | |
| 2009/0107033 A1 | 4/2009 | Gudde et al. | |
| 2009/0124839 A1 | 5/2009 | Dumesic et al. | |
| 2009/0126260 A1 | 5/2009 | Aravanis et al. | |
| 2009/0158637 A1* | 6/2009 | McCall et al. | 44/308 |
| 2009/0229174 A1* | 9/2009 | Brady et al. | 44/308 |
| 2009/0250376 A1 | 10/2009 | Brandvold et al. | |
| 2009/0253947 A1 | 10/2009 | Brandvold et al. | |
| 2009/0253948 A1 | 10/2009 | McCall et al. | |
| 2009/0287029 A1* | 11/2009 | Anumakonda et al. | 585/16 |
| 2009/0294324 A1 | 12/2009 | Brandvold et al. | |
| 2010/0287821 A9* | 11/2010 | Myllyoja et al. | 44/308 |
| 2011/0061290 A1* | 3/2011 | Aulich et al. | 44/308 |

FOREIGN PATENT DOCUMENTS

| | | |
|---|---|---|
| CN | 11343552 A | 1/2009 |
| EP | 1719811 A1 | 8/2006 |
| EP | 2046917 A | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

OTHER PUBLICATIONS

Elliott, et al. "Hydrotreating Biomass Liquids to Produce . . . ", presented in Washington, D.C., Apr. 7-10, 1986, published by IGT, Chicago: 1987. Chapter 42, pp. 765-784.

Baker, et al. "Technoeconomic Assessment of Direct Biomass Liquefaction to Transportation Fuels", Biomass 22 (1990) pp. 251-269.

Elliott, et al. "Developments in Thermochemical Biomass Conversion." vol. 1, pp. 611-621, Blackie Academic & Professional, London: 1996.

Speight, J. G., The Chemistry and Technology of Petroleum, 3rd ed., Marcel-Dekker, p. 918.

U.S. Office Action, U.S. Appl. No. 12/419,005, Notification date:Dec. 27, 2011.

Office Action dated Jun. 21, 2011 for U.S. Appl. No. 12/418,986, Brandvold et al.

Applicant's Sep. 21, 2011 response to the Jun. 21, 2011 Office Action for U.S. Appl. No. 12/418,986, Brandvold et al.

Office Action dated Dec. 12, 2011 for U.S. Appl. No. 12/418,986, Brandvold et al.

Applicant's Mar. 12, 2012 response to the Dec. 12, 2011 Office Action for U.S. Appl. No. 12/418,986, Brandvold et al.

Office Action dated Jun. 16, 2011 for U.S. Appl. No. 12/418,994, Brandvold et al.

Applicant's Sep. 16, 2011 response to the Jun. 16, 2011 Office Action for U.S. Appl. No. 12/418,994, Brandvold et al.

Office Action dated Nov. 29, 2011 for U.S. Appl. No. 12/418,994, Brandvold et al.

Applicant's Feb. 29, 2012 response to the Nov. 29, 2011 Office Action for U.S. Appl. No. 12/418,994, Brandvold et al.

Office Action dated Jun. 16, 2011 for U.S. Appl. No. 12/418,971, Brandvold et al.

Applicant's Sep. 16, 2011 response to the Jun. 16, 2011 Office Action for U.S. Appl. No. 12/418,971, Brandvold et al.

Office Action dated Dec. 1, 2011 for U.S. Appl. No. 12/418,971, Brandvold et al.

Applicant's Feb. 29, 2012 response to the Dec. 1, 2011 Office Action for U.S. Appl. No. 12/418,971, Brandvold et al.

Applicant's Mar. 27, 2012 response to the Dec. 27, 2011 Office Action for U.S. Appl. No. 12/419,005, McCall et al.

Office Action dated May 17, 2012 for U.S. Appl. No. 12/418,994, Brandvold et al.

Applicant's Sep. 17, 2012 response to the May 17, 2012 Office Action for U.S. Appl. No. 12/418,994, Brandvold et al.

Office Action dated May 22, 2012 for U.S. Appl. No. 12/418,971, Brandvold et al.

Applicant's Sep. 17, 2012 response to the May 22, 2012 Office Action for U.S. Appl. No. 12/418,971, Brandvold et al.

Office Action dated Jun. 4, 2012 for U.S. Appl. No. 12/419,005, McCall et al.

Applicant's Sep. 7, 2012 response to the Jun. 4, 2012 Office Action for U.S. Appl. No. 12/419,005, McCall et al.

Office Action dated Mar. 27, 2012 for U.S. Appl No. 12/418,986, Brandvold et al.

* cited by examiner

PRODUCTION OF BLENDED FUEL FROM RENEWABLE FEEDSTOCKS

CROSS-REFERENCE TO RELATED APPLICATION

This application claims priority from Provisional Application Ser. No. 61/042,747 filed Apr. 6, 2008, the contents of which are hereby incorporated by reference in its entirety.

STATEMENT REGARDING FEDERALLY SPONSORED RESEARCH OR DEVELOPMENT

This invention was made under the support of the United States Government, United States Army Research Office, with financial support from DARPA, Agreement Number W911NF-07-C-0049. The United States Government has certain rights in the invention.

BACKGROUND OF THE INVENTION

The process produces one or more blended fuels from renewable feedstocks including biomass derived pyrolysis oil and the triglycerides and free fatty acids found in plant and animal oils fats and greases. At least one paraffin rich component is produced from the triglycerides and free fatty acids found in plant and animal oils fats and greases while at least one cyclic rich component is produced from a biomass derived pyrolysis oil. At least one paraffin rich fuel component and at least one aromatic rich fuel component are blended to form at least one fuel.

The generation of the paraffin rich component employs a process for producing hydrocarbons useful as at least diesel fuel and aviation fuel or fuel blending components from renewable feedstocks such as the triglycerides and free fatty acids found in materials such as plant oils, fish oils, animal fats, and greases. The process involves hydrogenation, deoxygenation (decarboxylation, decarbonylation, and/or hydrodeoxygenation) in at least a first zone and hydroisomerization and hydrocracking in at least a second zone. A selective hot high pressure hydrogen stripper is used to remove at least the carbon oxides from the hydrogenation, decarboxylation and/or hydrodeoxygenation zone effluent before entering the hydroisomerization and hydrocracking zone. Optionally, a diesel range stream, a naphtha/gasoline range stream, a naphtha/gasoline and LPG range stream, or any mixture thereof is used as an additional rectification agent in the selective hot high pressure hydrogen stripper to decrease the amount of product carried in the overhead thereby reducing the amount of n-paraffins in the diesel and aviation fuels.

As the demand for gasoline, diesel fuel, and aviation fuel increases worldwide there is increasing interest in sources other than petroleum crude oil for producing these fuels. One such source is what has been termed renewable feedstocks. These renewable feedstocks include, but are not limited to, plant oils such as corn, rapeseed, jatropha, camelina, crambe, canola, soybean and algal oils, animal fats such as tallow, fish oils and various waste streams such as yellow and brown greases and sewage sludge. The common feature of these feedstocks is that they are composed of glycerides and Free Fatty Acids (FFA) and free fatty alkyl esters. These compounds contain aliphatic carbon chains having from about 8 to about 24 carbon atoms. The aliphatic carbon chains in the triglycerides or FFAs or free fatty alkyl esters can also be mono-, di- or poly-unsaturated. Some of the glycerides from the renewable sources may be monoglycerides or diglycerides instead of or in addition to the triglycerides.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as paraxylene. U.S. Pat. No. 4,992,605 discloses the production of hydrocarbon products in the diesel boiling point range by hydroprocessing vegetable oils such as canola or sunflower oil. Finally, US 2004/0230085 A1 discloses a process for treating a hydrocarbon component of biological origin by hydrodeoxygenation followed by isomerization.

The paraffin rich blending component is generated by a process which comprises one or more steps to hydrogenate, deoxygenate, isomerize and selectively hydrocrack a renewable feedstock in order to generate a gasoline range product, a diesel range product, and an aviation range product. Simply hydrogenating and deoxygenating the renewable feedstock in a hydrogen environment in the presence of a hydrotreating catalyst results in straight chain paraffins having chain-lengths similar to, or slightly shorter than, the fatty acid composition of the feedstock. With many feedstocks, this approach results in a fuel meeting the general parameters for a diesel fuel, but not those for an aviation fuel. The selective hydrocracking reaction reduces the carbon chain length to allow selectivity to aviation fuel range paraffins while minimizing lower molecular weight products. The volume ratio of recycle hydrocarbon to feedstock ranges from about 0.1:1 to about 8:1 and provides a mechanism to limit reaction zone temperature rise, increase the hydrogen solubility and more uniformly distribute the heat of reaction in the reaction mixture. As a result of the recycle, some embodiments may use less processing equipment, less excess hydrogen, less utilities, or any combination of the above.

The performance of the isomerization and selective hydrocracking catalyst is improved by removing at least carbon dioxide from the feed to the isomerization and selective hydrocracking zone. The presence of oxygen containing molecules including water, carbon dioxide, and other carbon oxides may result in the deactivation of the isomerization catalyst. The oxygen containing molecules such as carbon dioxide, carbon monoxide and water are removed using a selective hot high pressure hydrogen stripper which optionally contains a rectification zone.

The generation of the cyclic rich component employs a process for obtaining cyclic rich component from biomass. More particularly, this process relates to the treatment of cellulosic waste, or pyrolysis oil, produced from the pyrolysis of biomass to produce fuel or fuel blending or additive components. The fuel, fuel additives, or blending components may include those in the gasoline boiling point range, the diesel boiling point range, and the aviation boiling point range.

As discussed above, renewable energy sources are of increasing importance. They are a means of reducing dependence on petroleum oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. Lignocellulosic biomass, or cellulosic biomass as used throughout the remainder of this document, consists of the three principle biopolymers cellulose, hemicellulose, and lignin. The ratio of these three components varies depending on the biomass source. Cellulosic biomass might also contain lipids, ash, and protein in varying amounts. The economics for converting biomass to fuels or chemicals depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. Biomass is also generated in many everyday processes as a waste product, such as waste material from crops. In addition, biomass contributes to the removal of carbon dioxide from the atmosphere as the biomass grows. The use of biomass can be one process for recycling atmospheric carbon while producing fuels and chemical precursors. Biomass when heated at short contact times in an environment with low or no oxygen, termed pyrolysis, will generate a liquid product known as pyrolysis oil. Synonyms for pyrolysis oil include bio-oil, pyrolysis liquids, bio-crude oil, wood liquids, wood oil, liquid smoke, wood distillates, pyroligneous acid, and liquid wood.

The product of the biomass pyrolysis, the pyrolysis oil, contains what is known as pyrolytic lignin. Pyrolytic lignin is the water insoluble portion of the pyrolysis oil. The pyrolysis oil may be processed whole, or a portion of the aqueous phase may be removed to provide a pyrolysis oil enriched in pyrolytic lignin which is processed through deoxygenation to produce the cyclic rich fuel blending component.

At least one paraffin rich component and at least one cyclic rich component are blended to form a fuel. The blending is controlled so that the blended fuel meets specific requirements of a target fuel. Other additives or components may be blended with the paraffin rich component and the cyclic rich component in order to meet additional requirements of the target fuel. The target fuel may be in the boiling point ranges of gasoline, aviation, and diesel, and may be entirely derived from renewable sources. The target fuel is designed to power engines or devices that are currently distributed around the world without requiring upgrades to those engines. The target fuel may be blended to meet the specifications using entirely renewable feedstock derived blending components.

SUMMARY OF THE INVENTION

A process for producing a blended fuel where at least one paraffin rich component and at least one cyclic rich component are blended to form a target fuel, and wherein the paraffin rich component and the cyclic rich component are each produced from a renewable feedstock. The paraffin rich component is produced from the triglycerides and free fatty acids found in plant and animal oils, fats, and greases, and the cyclic rich component is produced from a biomass derived pyrolysis oil.

The portion of the process which provides the paraffin rich component comprises treating the feedstock in a reaction zone by hydrogenating and deoxygenating the feedstock at reaction conditions to provide a first reaction zone product comprising n-paraffins. The carbon dioxide and water generated as byproducts in the first reaction zone are selectively removed from the first reaction product in an integrated hot high pressure stripper using hydrogen as the stripping gas. A diesel range stream, an aviation range stream, a naphtha/ gasoline range stream, a naphtha/gasoline and LPG range stream or any mixture thereof may be optionally used as a rectification agent in the selective hot high pressure hydrogen stripper to decrease the amount of first reaction zone diesel and aviation range product carried in the overhead of the selective hot high pressure hydrogen stripper. Note that the naphtha/gasoline range stream is within the boiling point range for gasoline and therefore may also be considered a gasoline boiling point range stream. The hydrogen stripped first reaction zone product is introduced to a hydroisomerization and selective cracking reaction zone. The selective hydrocracking allows for aviation fuel range products, if desired, by preferentially cracking C1 to C6 fragments off the end of the longer chain paraffins and by minimizing the number of cracking events per molecule. The desired product, at least one paraffin rich component in the diesel boiling point range, the aviation boiling point range, and or the naphthene boiling range product, is recovered.

The portion of the process which provides the cyclic rich component has biomass derived pyrolysis oil as the renewable feedstock. The pyrolysis oil was derived from the pyrolysis of biomass. The pyrolysis oil may optionally be enriched in pyrolytic lignin through the removal of at least a portion of the aqueous phase, but the process also allows the whole pyrolytic lignin of the pyrolysis oil to be processed without removal of a portion of the aqueous phase. The whole pyrolysis oil or the pyrolytic lignin enriched pyrolysis oil, is treated in a first deoxygenation zone generating a partially deoxygenated stream. Water, gasses, and light ends are removed and the remainder of the partially deoxygenated stream is further treated in a second deoxygenation zone to produce a deoxygenated product stream. The deoxygenated product stream comprises cyclic hydrocarbon compounds that when fractionated are useful as the cyclic rich component(s) in the gasoline and naphtha/gasoline, aviation, and diesel boiling point ranges.

After the second deoxygenation zone, water light ends, and gasses may be removed from the effluent of the second deoxygenation zone. Hydrogen may be separated and recycled. In one embodiment the first and second deoxygenation zones are combined and housed within in a single reactor.

At least one paraffin rich component and at least one cyclic rich component are blended to form at least one fuel.

BRIEF DESCRIPTION OF THE DRAWINGS

FIG. 1 shows the option where a portion of the branched-paraffin-enriched product is conducted to the hot high pressure hydrogen stripper as a rectification agent to decrease the amount of first reaction zone product carried in the overhead of the selective hot high pressure hydrogen stripper. Other hydrocarbon streams may be used as a rectification agent.

FIG. 2 shows the option where the whole pyrolysis oil is processed through two stages of deoxygenation.

DETAILED DESCRIPTION OF THE INVENTION

Figure 1:
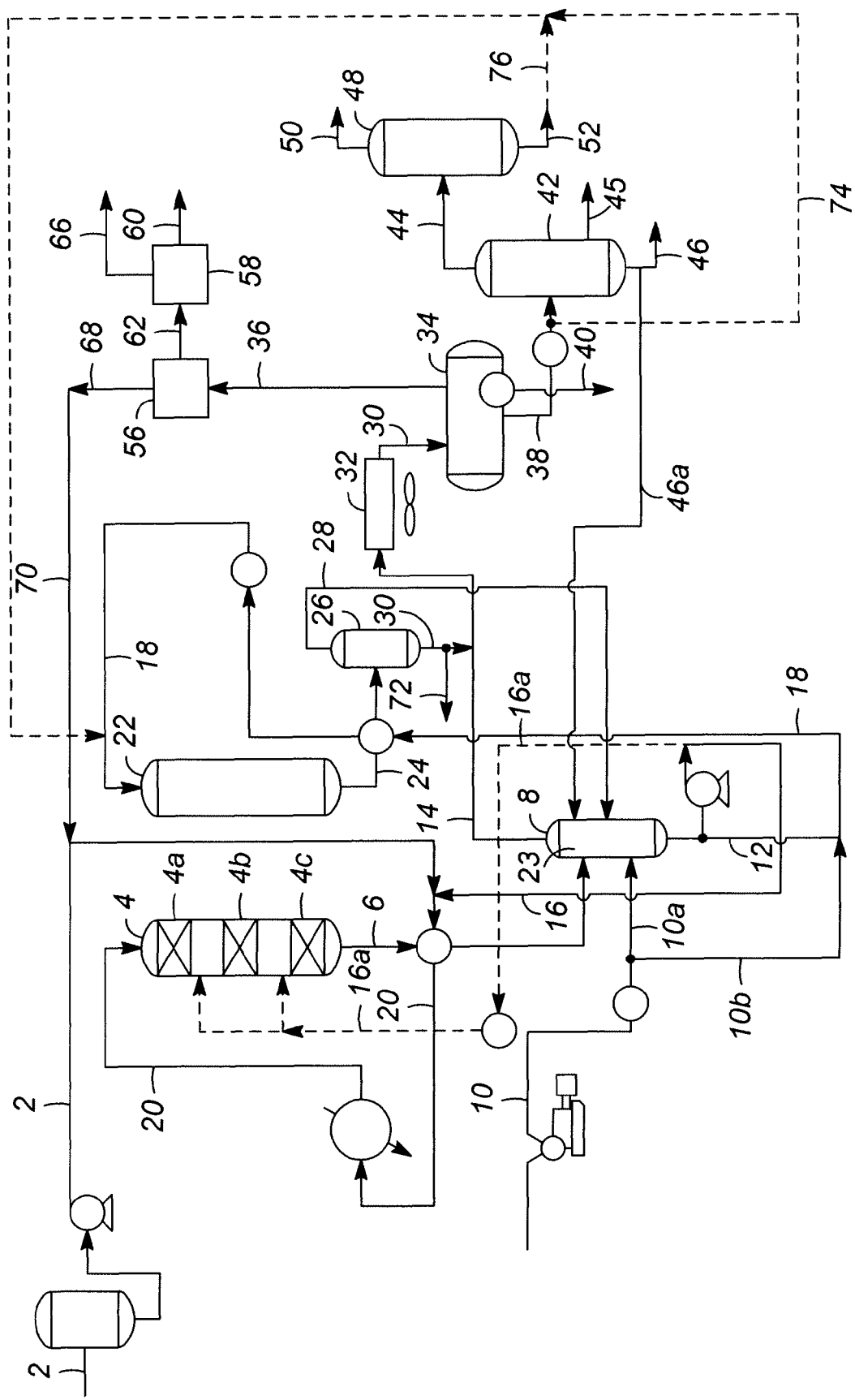
FIG. 1 is a schematic of one embodiment a process for generating the paraffin rich component.

The invention provides a process for generating at least one paraffin rich component from a renewable feedstock and at least one cyclic rich component from a renewable feedstock, and blending at least those two components to provide a blended fuel.

Generating the Paraffin Rich Component

The paraffin rich component may be one or more hydrocarbon streams, a diesel boiling point range product, an aviation boiling point range product, and a naphtha/gasoline boiling point range product from renewable feedstocks such as feedstocks originating from plants or animals. The term "rich" is meant to indicate at least 40 mass-%. The term renewable feedstock is meant to include feedstocks other than those obtained from petroleum crude oil. Another term that has been used to describe members of this class of feedstock is biorenewable fats and oils. The renewable feedstocks that can be used to generate the paraffin rich component include any of those which comprise glycerides and free fatty acids (FFA) and possibly free fatty alkyl esters. Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, jatropha oil, inedible tallow, yellow and brown greases, lard, train oil, fats in milk, fish oil, algal oil, sewage sludge, cuphea oil, camelina oil, crambe oil, jatropha oil, curcas oil, babassu oil, palm kernel oil, and the like. The glycerides and FFAs and free fatty alkyl esters of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and fossil fuel-derived, such as petroleum-derived, hydrocarbons may also be used as the feedstock. Other feedstock components which may be used, especially as a co-feed component in combination with the above listed feedstocks include spent motor oils and industrial lubricants, used paraffin waxes, liquids derived from the gasification of coal, biomass, natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process.

The renewable feedstocks that can be used to generate the paraffin rich component may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an acid such as sulfuric, nitric, phosphoric, or hydrochloric and water in a reactor. The acidic aqueous solution and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. application Ser. No. 11/770,826, hereby incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate the reactive components such as olefinic or unsaturated portions of the n-paraffinic chains. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The catalysts enumerated above are also capable of catalyzing decarboxylation, decarbonylation and/or hydrodeoxygenation of the feedstock to remove oxygen. Decarboxylation, decarbonylation, and hydrodeoxygenation are herein collectively referred to as deoxygenation reactions. Decarboxylation conditions include a relatively low pressure of about 689 kPa (100 psia) to about 6895 kPa (1000 psia), a temperature of about 200° C. to about 400° C. and a liquid hourly space velocity of about 0.5 to about 10 hr$^{-1}$. In another embodiment the decarboxylation conditions include the same relatively low pressure of about 689 kPa (100 psia) to about 6895 kPa (1000 psia), a temperature of about 288° C. to about 345° C. and a liquid hourly space velocity of about 1 to about 4 hr$^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all the reactions occur simultaneously in one reactor or in one bed. Alternatively, the conditions can be controlled such that hydrogenation primarily occurs in one bed and decarboxylation and/or hydrodeoxygenation occurs in a second bed. Of course if only one bed is used, then hydrogenation occurs primarily at the front of the bed, while decarboxylation/hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor.

The reaction product from the hydrogenation and deoxygenation reactions will comprise both a liquid portion and a gaseous portion. The liquid portion comprises a hydrocarbon fraction comprising n-paraffins and having a large concentration of paraffins in the 15 to 18 carbon number range. Different feedstocks will result in different distributions of paraffins. A portion of this hydrocarbon fraction, after separation from the gaseous portion, may be used as the hydrocarbon recycle described above. Although this hydrocarbon fraction is useful as a diesel fuel or diesel fuel blending component, additional fuels, such as aviation fuels or aviation fuel blending components which typically have a concentration of paraffins in the range of about 9 to about 15 carbon atoms, may be produced with additional processing. Also, because the hydrocarbon fraction comprises essentially all n-paraffins, it will have poor cold flow properties. Many diesel and aviation fuels and blending components must have better cold flow properties and so the reaction product is further reacted under isomerization conditions to isomerize at least a portion of the n-paraffins to branched paraffins.

The gaseous portion comprises hydrogen, carbon dioxide, carbon monoxide, water vapor, propane and perhaps sulfur components such as hydrogen sulfide or phosphorous component such as phosphine. The effluent from the deoxygenation zone is conducted to a hot high pressure hydrogen stripper. One purpose of the hot high pressure hydrogen stripper is to selectively separate at least a portion of the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The hydrogen used for the stripping may be dry, and free of carbon oxides. The temperature may be controlled in a limited range to achieve the desired separation and the pressure may be maintained at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the reaction zone. By "essentially", it is meant that the operating pressure of the hot high pressure hydrogen stripper is within about 1034 kPa absolute (150 psia) of the operating pressure of the reaction zone. For example, in one embodiment the hot high pressure hydrogen stripper separation zone is no more than 1034 kPa absolute (150 psia) less than that of the reaction zone.

The effluent enters the hot high pressure stripper and at least a portion of the gaseous components, are carried with the hydrogen stripping gas and separated into an overhead stream. The remainder of the deoxygenation zone effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below.

A portion of the lighter hydrocarbons generated in the deoxygenation zone may be also carried with the hydrogen in the hot high pressure hydrogen stripper and removed in the overhead stream. Any hydrocarbons removed in the overhead stream will effectively bypass the isomerization zone, discussed below. A large portion of the hydrocarbons bypassing the isomerization zone will be normal hydrocarbons which, due to bypassing the isomerization stage, will not be isomerized to branched hydrocarbons. At least a portion of these normal hydrocarbons ultimately end up in the diesel range product or the aviation range product, and depending upon the specifications required for the products, the normal hydrocarbons may have an undesired effect on the diesel range product and the aviation range product. For example, in applications where the diesel range product is required to meet specific cloud point specifications, or where the aviation range product is required to meet specific freeze point specifications, the normal hydrocarbons from the hot high pressure hydrogen stripper overhead may interfere with meeting the required specification. Therefore, in some applications it is advantageous to take steps to prevent normal hydrocarbons from being removed in the hot high pressure hydrogen stripper overhead and bypassing the isomerization zone. For example, one or more, or a mixture of additional rectification agents may be optionally introduced into the hot high pressure hydrogen stripper to reduce the amount of hydrocarbons in the hot high pressure hydrogen stripper overhead stream. Suitable example of additional rectification agents include the diesel boiling point range product, the aviation boiling point range product, the naphtha/gasoline boiling range product, the mixture of naphtha/gasoline and LPG, or any combinations thereof. These streams may be recycled and introduced to the hot high pressure hydrogen stripper, at a location of the stripper that is above the deoxygenation zone effluent introduction location and in the rectification zone. The rectification zone, if present, may contain vapor liquid contacting devices such as trays or packing to increase the efficiency of the rectification. The optional rectification agent would operate to force an increased amount of the hydrocarbon product from the deoxygenation zone to travel downward in the hot high pressure hydrogen stripper and be removed in the hot high pressure hydrogen stripper bottoms stream instead of being carried with the stripping hydrogen gas into the hot high pressure hydrogen stripper overhead. Other rectification agents from independent sources may be used instead of, or in combination with, the diesel boiling point range product, the naphtha/gasoline product, and the naphtha/gasoline and LPG stream.

Hydrogen is a reactant in at least some of the reactions above, and a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia) which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia)

to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon to the deoxygenation reaction zone. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the combined liquid phase in the reaction zone is greatly increased and higher pressures are not needed to increase the amount of hydrogen in solution. In one embodiment of the invention, the volume ratio of hydrocarbon recycle to feedstock is from about 2:1 to about 8:1. In another embodiment the ratio is in the range of about 3:1 to about 6:1 and in yet another embodiment the ratio is in the range of about 4:1 to about 5:1.

Although the hydrocarbon fraction separated in the hot high pressure hydrogen stripper is useful as a diesel fuel or diesel fuel blending component, because it comprises essentially n-paraffins, it will have poor cold flow properties. Also, depending upon the feedstock, the amount of hydrocarbons suitable for aviation fuel or aviation fuel blending component may be small. Therefore the hydrocarbon fraction is contacted with an isomerization catalyst under isomerization conditions to at least partially isomerize the n-paraffins to branched paraffins and improve the cold flow properties of the liquid hydrocarbon fraction. The isomerization catalysts and operating conditions are selected so that the isomerization catalyst also catalyzes selective hydrocracking of the paraffins. The selective hydrocracking creates hydrocarbons in the aviation boiling point range. The effluent of the second reaction zone, the isomerization and selective hydrocracking zone, is a branched-paraffin-enriched stream. By the term "enriched" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization and selective hydrocracking can be carried out in a separate bed of the same reactor, described above or the isomerization and selective hydrocracking can be carried out in a separate reactor. For ease of description, the following will address the embodiment where a second reactor is employed for the isomerization and selective hydrocracking reactions. The hydrogen stripped product of the deoxygenation reaction zone is contacted with an isomerization and selective hydrocracking catalyst in the presence of hydrogen at isomerization and selective hydrocracking conditions to isomerize at least a portion of the normal paraffins to branched paraffins. Due to the presence of hydrogen, the reactions may be called hydroisomerization and hydrocracking.

The isomerization and selective hydrocracking of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled upflow modes are both suitable. See also, for example, US 2004/0230085 A1 which is incorporated by reference in its entirety. Catalysts having an acid function and mild hydrogenation function are favorable for catalyzing both the isomerization reaction and the selective hydrocracking reaction. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline or a combination of the two. Suitable support materials include aluminas, silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for selective hydrocracking and isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization and selective hydrocracking catalyst may also comprise a modifier selected from the group consisting of lanthanum, cerium, praseodymium, neodymium, phosphorus, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. An activated carbon catalyst support may also be used. U.S. Pat. No. 5,981,419 and U.S. Pat. No. 5,908,134 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization and selective hydrocracking catalyst may be any of those well known in the art such as those described and cited above. Isomerization and selective cracking conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization and selective hydrocracking zone are well known in the art. Some known isomerization catalysts, when operated under more severe conditions, also provide the selective hydrocracking catalytic function.

The isomerization and selective cracking zone effluent is processed through one or more separation steps to obtain two purified hydrocarbon streams, one useful as a diesel fuel or a diesel fuel blending component and the second useful as aviation fuel or an aviation fuel blending component. Depending upon the application, various additives may be combined with the diesel or aviation fuel composition generated in order to meet required specifications for different specific fuels. In particular, the aviation fuel composition generated herein complies with, is a blending component for, or may be combined with one or more additives to meet at least one of: ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type ML-DTL-83133, JP-8, ML-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification MIL-DTL-83133, which is a military grade type of highly refined kerosene based jet propellant specified by the United States Government. The fuel produced from glycerides or FAAs is very similar to isoparaffinic kerosene or iPK, also known as synthetic paraffinic kerosene (SPK) and as a synthetic jet fuel.

The specifications for different types of fuels are often expressed through acceptable ranges of chemical and physical requirements of the fuel. As stated above, aviation turbine fuels, a kerosene type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet a particular specification is quite common. While the product of the present invention may have desired fuel parameters or characteristics, it is expected that some blending of the product with other blending components may be required to meet the desired set of fuel specifications, or a future set of specifications required for such fuels. In other words, the aviation product of this invention is a composition which may be used with other components to form a fuel meeting at least one of the specifications for aviation fuel such as JP-8. The desired products are highly paraffinic distillate fuel components having a paraffin content of at least 75% by volume.

With the effluent stream of the isomerization and selective hydrocracking zone comprising both a liquid component and a gaseous component, various portions of which may be recycled, multiple separation steps may be employed. For example, hydrogen may be first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a rectification gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the deoxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the isomerization effluent after the removal of hydrogen still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization. Prior to entering the cold separator, the remainder of the isomerization and selective hydrocracking zone effluent may be combined with the hot high pressure hydrogen stripper overhead stream, and the resulting combined stream may be introduced into the cold separator.

The liquid component contains the hydrocarbons useful as diesel fuel or diesel fuel blending components and aviation fuel or aviation fuel blending components, termed diesel boiling point range product and aviation boiling point range product, respectively, as well as smaller amounts of naphtha/gasoline and LPG. The separated liquid component is further purified in a product distillation zone which separates lower boiling components and dissolved gases into an LPG and naphtha/gasoline stream; an aviation range product; and a diesel range product. Suitable operating conditions of the product distillation zone include a temperature of from about 20 to about 200° C. at the overhead and a pressure from about 0 to about 1379 kPa absolute (0 to 200 psia). The conditions of the distillation zone may be adjusted to control the relative amounts of hydrocarbon contained in the aviation range product stream and the diesel range product stream.

The LPG and naphtha/gasoline stream may be further separated in a debutanizer or depropanizer in order to separate the LPG into an overhead stream, leaving the naphtha/gasoline in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used in other processes such as a feed to a hydrogen production facility. Similarly, the naphtha/gasoline may be used in other processes, such as the feed to a hydrogen production facility.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide was not removed, its concentration would quickly build up and effect the operation of the isomerization zone. The carbon dioxide can be removed from the hydrogen by means well known in the art such as reaction with a hot carbonate solution, pressure swing absorption, etc. Amine absorbers may be employed as taught in copending U.S. application Ser. No. 12/193,176 and U.S. application Ser. No. 12/193,196, hereby incorporated by reference. If desired, essentially pure carbon dioxide can be recovered by regenerating the spent absorption media.

Similarly, a sulfur containing component such as hydrogen sulfide may be present to maintain the sulfided state of the deoxygenation catalyst or to control the relative amounts of the decarboxylation reaction and the hydrogenation reaction that are both occurring in the deoxygenation zone. The amount of sulfur is generally controlled and so must be removed before the hydrogen is recycled. The sulfur components may be removed using techniques such as absorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide may be recycled to the reaction zone where hydrogenation primarily occurs and/or to any subsequent beds or reactors. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

As discussed above, at least a portion of the diesel boiling point range product; at least a portion of the aviation boiling point range product; at least a portion of the LPG and naphtha/gasoline stream; at least a portion of a naphtha/gasoline stream or an LPG stream generated by separating the LPG and naphtha/gasoline stream into an LPG stream and the naphtha/gasoline stream; or any combination thereof may be recycled to the optional rectification zone of the hot high pressure hydrogen stripper.

The following embodiment is presented in illustration of this portion of the process to generate the paraffin rich component and is not intended as an undue limitation on the generally broad scope of the invention as set forth in the claims.

Turning to FIG. 1, the process for generating the paraffin rich component begins with a renewable feedstock stream 2 which may pass through an optional feed surge drum. The feedstock stream is combined with recycle gas stream 68 and recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling point range and a gaseous component containing largely hydrogen, vaporous water, carbon monoxide, carbon dioxide and propane.

Deoxygenation reactor effluent stream 6 is then directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is selectively stripped from the liquid component of deoxygenation reactor effluent 6 using make-up hydrogen 10a and recycle hydrogen 28. The dissolved gaseous component comprising hydrogen, vaporous water, carbon monoxide, carbon dioxide and at least a portion of the propane, is selectively separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and or between beds 4b and 4c in order, or example, to aid in temperature control. The remainder of hot high pressure hydrogen stripper bottoms in stream 12 is combined with hydrogen stream 10b to form combined stream 18 which is routed to isomerization and selective hydrocracking reactor 22. Stream 18 may be heat exchanged with isomerization reactor effluent 24.

The product of the isomerization and selective hydrocracker reactor containing a gaseous portion of hydrogen and propane and a branched-paraffin-enriched liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44, components within the boiling range of aviation fuel is removed in stream 45, with the remainder, the diesel range components, being withdrawn from product stripper 42 in line 46. Optionally, a portion of the diesel range components in line 46 are recycled in line 46a to hot high pressure hydrogen stripper 8 optional rectification zone 23 and used as an additional rectification agent. Stream 44 is introduced into fractionator 48 which operates to separate LPG into overhead 50 leaving a naphtha/gasoline bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine scrubber zone 58 and into line 66. The amine may be regenerated which releases the hydrogen sulfide into line 60. Regenerated amine is then reused, and the hydrogen sulfide may be recycled to the deoxygenation reaction zone. Conditions for the first scrubber zone includes a temperature in the range of 30 to 60° C. The first absorber is operated at essentially the same pressure as the reaction zone. By "essentially" it is meant that the operating pressure of the first absorber is within about 1034 kPa absolute (150 psia) of the operating pressure of the reaction zone. For example, the pressure of the first absorber is no more than 1034 kPa absolute (150 psia) less than that of the reaction zone. The second amine absorber zone is operated in a pressure range of from 138 kPa absolute (20 psia) to 241 kPa absolute (35 psia). Also, at least the first the absorber is operated at a temperature that is at least 1° C. higher than that of the separator. Keeping the absorbers warmer than the separator operates to maintain any light hydrocarbons in the vapor phase and prevents the light hydrocarbons from condensing into the absorber solvent.

It is readily understood that instead of a portion of the diesel range components in line 46 being optionally recycled in line 46a to hot high pressure hydrogen stripper 8 optional rectification zone 23 and used as a rectification agent, a portion of naphtha/gasoline bottoms 52 is optionally recycled to hot high pressure hydrogen stripper 8 optional rectification zone 23 and used as a rectification agent. Similarly, instead of a portion of the diesel range components in line 46 being optionally recycled in line 46a to hot high pressure hydrogen stripper 8 optional rectification zone 23 and used as a rectification agent, the diesel range components in line 46a and portion of naphtha/gasoline bottoms 52 combined to form a rectification agent stream which is optionally recycled to hot high pressure hydrogen stripper 8 optional rectification zone 23 and used as a rectification agent.

Minimizing the amount of normal paraffins that bypass the isomerization and selective hydrocracking zone helps to meet freeze point specifications for many aviation fuels without having to significantly lower the quantity of aviation fuel produced. Normal paraffins that bypass the isomerization and selective hydrocracking zone are not isomerized and the normal paraffins generally have higher freeze points than the corresponding isomerized paraffins. To demonstrate the success of the optional rectification zone, the invention both including and not including the rectification zone in the hot high pressure hydrogen stripper was simulated in a model simulation. In the simulations, a maximum distillate production was set and a −10° C. cloud point target for the diesel range product was set. In the simulation where the optional rectification zone was not employed, the overall percentage of hydrocarbons in the aviation range plus the diesel range that bypassed the isomerization and selective cracking zone via the hot high pressure hydrogen stripper overhead stream was determined to be 4.95 mass-% and the percentage of hydrocarbons in the aviation range that bypassed the isomerization and selective cracking zone via the hot high pressure hydrogen stripper overhead stream was determined to be 5.45 mass-%. The simulation was repeated, this time using the optional rectification zone in the hot high pressure hydrogen stripper as shown in FIG. 1. In this simulation, the overall percentage of hydrocarbons in the aviation range plus the diesel range that bypassed the isomerization and selective cracking zone via the hot high pressure hydrogen stripper overhead stream was determined to be 1.12 mass-% and the percentage of hydrocarbons in the aviation range that bypassed the isomerization and selective cracking zone via the hot high pressure hydrogen stripper overhead stream was determined to be 4.07 mass-%. The result of this change corresponds to either a reduction of aviation fuel product freeze point of 7° C. at a constant aviation fuel product yield of 10.4 mass-%, or an increase in aviation fuel production of 9 mass-% at a constant −40° C. freeze point.

Example of Paraffin Rich Component

Deoxygenation of refined canola oil over the deoxygenation catalyst CAT-DO was accomplished by mixing the canola oil with a 2500 ppm S co-feed and flowing the mixture down over the catalyst in a tubular furnace at conditions of about 330° C., 3447 kPa gauge (500 psig), LHSV of 1 h$^{-1}$ and an $H_2$/feed ratio of about 4000 scf/bbl. The soybean oil was completely deoxygenated and the double bonds hydrogenated to produce an n-paraffin mixture having predominantly from about 15 to about 18 carbon atoms; deoxygenation products CO, $CO_2$, $H_2O$, and propane; with removal of the sulfur as $H_2S$.

The n-paraffin product from the deoxygenation stage was fed over a selective cracking/isomerization catalyst in a second process step. The n-paraffin mixture was delivered down flow over the selective cracking/isomerization catalyst in a tubular furnace at conditions of about 355° C., 4140 kPa gauge (600 psig), 1.0 LHSV and an $H_2$/feed ratio of about 2100 scf/bbl. The product from this selective cracking and isomerization step was fractionated and the jet fuel range material (as defined in the specification for JP-8, MIL-DTL-83133) was collected. After fractionation, the two stage process produced 18 wt.-% jet fuel-range paraffins with a high iso/normal ratio. The properties of final jet fuel produced are shown in Table 1.

TABLE 1

| Sample: | Freeze Point, ° C. | Flash Point, ° C. | Density, g/cc |
|---|---|---|---|
| JP-8 Specifications | −47 max | 38 min | 0.775-0.840 |
| Canola oil aviation fuel range paraffin | −49 | 56 | 0.760 |

Generating the Cyclic Rich Component

The cyclic rich component may be one or more hydrocarbon streams, a diesel boiling point range product, an aviation boiling point range product, and a gasoline and naphtha/gasoline boiling point range product from renewable feedstocks such as feedstocks originating from lignocellulose. The term "rich" is meant to indicate at least 40 mass-%. In the U.S. and worldwide, there are huge amounts of lignocellulosic material, or biomass, which is not utilized, but is left to decay, often in a landfill, or just in an open field or forest. The material includes large amounts of wood waste products, and leaves and stalks of crops or other plant material that is regularly discarded and left to decay in fields. The emergence of inedible lipid-bearing crops for the production of renewable diesel will also produce increased amounts of biomass post extraction, often known as meal. Growth of cellulosic ethanol will also produce large amounts of a lignin side product. Biomass includes, but is not limited to, lignin, plant parts, fruits, vegetables, plant processing waste, wood chips, chaff, grain, grasses, corn, corn husks, weeds, aquatic plants, hay, meal, paper, paper products, recycled paper and paper products, and any cellulose containing biological material or material of biological origin. This biomass material can be pyrolyzed to make a pyrolysis oil, but due to poor thermal stability, the high water content of the pyrolysis oil, often greater than 25%, high total acid number often greater than 100, low heating value, and phase incompatibility with petroleum based materials, pyrolysis oil has found little use as a fuel.

This portion of the process substantially converts the pyrolysis oil from biomass into the cyclic rich component which may be naphtha/gasoline, aviation, and diesel boiling range components, having low acidity, low water, low oxygen, and low sulfur content. The pyrolysis of the biomass to form the pyrolysis oil is achieved by any technique known in the art, see for example, Mohan, D.; Pittman, C. U.; Steele, P. H. Energy and Fuels, 2006, 20, 848-889. Once the pyrolysis oil is generated from the biomass, although optional, it is not necessary to separate the pyrolytic lignin from the pyrolysis oil before further processing, thereby eliminating a step previously employed in industry. The whole pyrolysis oil may be processed, without a portion of the aqueous phase being removed to enrich the pyrolysis oil in the pyrolytic lignin. The pyrolytic lignin contains potentially high value products in the form of aromatic and naphthenic compounds having complex structures that comprises aromatic rings that are linked by oxygen atoms or carbon atoms. These structures can be broken into smaller segments when decarboxylated, decarbonylated, or hydrodeoxygenated, while maintaining the aromatic ring structures. One desired product is at least one cyclic hydrocarbon-rich stream. However, this processing of the pyrolytic lignin may be accomplished in the presence of the rest of the pyrolysis oil and no separation of the pyrolytic lignin before processing is required. Pyrolytic lignin is a pyrolysis product of the lignin portion of biomass. It can be separated from the rest of the whole pyrolysis oil during the pyrolysis process or through post-processing to produce an additional aqueous phase, which includes pyrolysis products primarily from the cellulose and hemicellulose portion of the biomass. The pyrolysis process can convert all components in the biomass feedstock into products useful as fuels or fuel components after full deoxygenation of the pyrolysis oil product. The water soluble components can also be transformed to naphthenes and aromatics under pyrolysis conditions. The production of heavier molecular weight products is known from steam cracking technology to produce light olefins, also run under pyrolysis conditions. Even feeds such as ethane, propane, and light naphtha/gasoline produce heavier side products in these thermal cracking processes. The amount of these heavier products depends on the conditions of the thermal cracking reactor. Optionally, the pyrolysis oil may be separated and only a portion of the pyrolysis oil be introduced to the partial deoxygenation zone.

The pyrolysis oil is fully deoxygenated in two separate zones, a partial deoxygenation zone and a full deoxygenation zone. The partial deoxygenation zone may also be considered to be a hydrotreating zone and the full deoxygenation zone may be considered to be a hydrocracking zone. "Full" deoxygenation is meant to include deoxygenating at least 99% of available oxygenated hydrocarbons. The zones will primarily be referred to herein as a partial deoxygenation zone and a full deoxygenation zone. In the partial deoxygenation zone, partial deoxygenation occurs at milder conditions than the full deoxygenation zone and uses a catalyst such as a hydrotreating catalyst. In general, the partial oxidation zone removes the most reactive and thermally instable oxygenates. The oxygen level of the pyrolysis oil feedstock, which typically ranges from about 35 wt. % to about 60 wt %, is reduced to a significantly lower level, from about 5 wt. % to about 20 wt. % in the partial deoxygenation zone. Water is reduced from pyrolysis oil feedstock levels from about 10 wt. % to about 40 wt. % to levels from about 2 wt. % to about 11 wt. %. The acidity is greatly reduced as well in the partial deoxygenation zone, from a TAN level of about 125 to about 200 in the pyrolysis oil feedstock to a reduced level from about 40 to about 100 in the partial deoxygenation zone effluent.

The more thermally stable effluent from the partial deoxygenation zone can then be fully deoxygenated in the full deoxygenation zone. In the full deoxygenation zone, a hydrocracking catalyst, which has higher activity as compared to the hydrotreating catalyst, is employed with the option of more severe process conditions in order to catalyze the deoxygenation of less reactive oxygenates. Some hydrocracking of feedstock molecules will also occur to a higher extent than in the partial deoxygenation zone. In the full deoxygenation zone, oxygen content is reduced from about 5 wt. % to about 20 wt. % to much lower levels, from ppm concentrations to about 0.5 wt. %. Water is also greatly reduced in the full deoxygenation zone, from about 2 wt. % to about 11 wt. % down to levels from about 100 ppm to about 1000 ppm. The acidity is greatly reduced from initial TAN levels of about 40 to about 100 mg KOH/g oil to lower levels from about 0.5 to about 4 mg KOH/g oil. The effluent of the full deoxygenation zone is a hydrocarbon mixture rich in naphthenes and aromatics.

Figure 2:
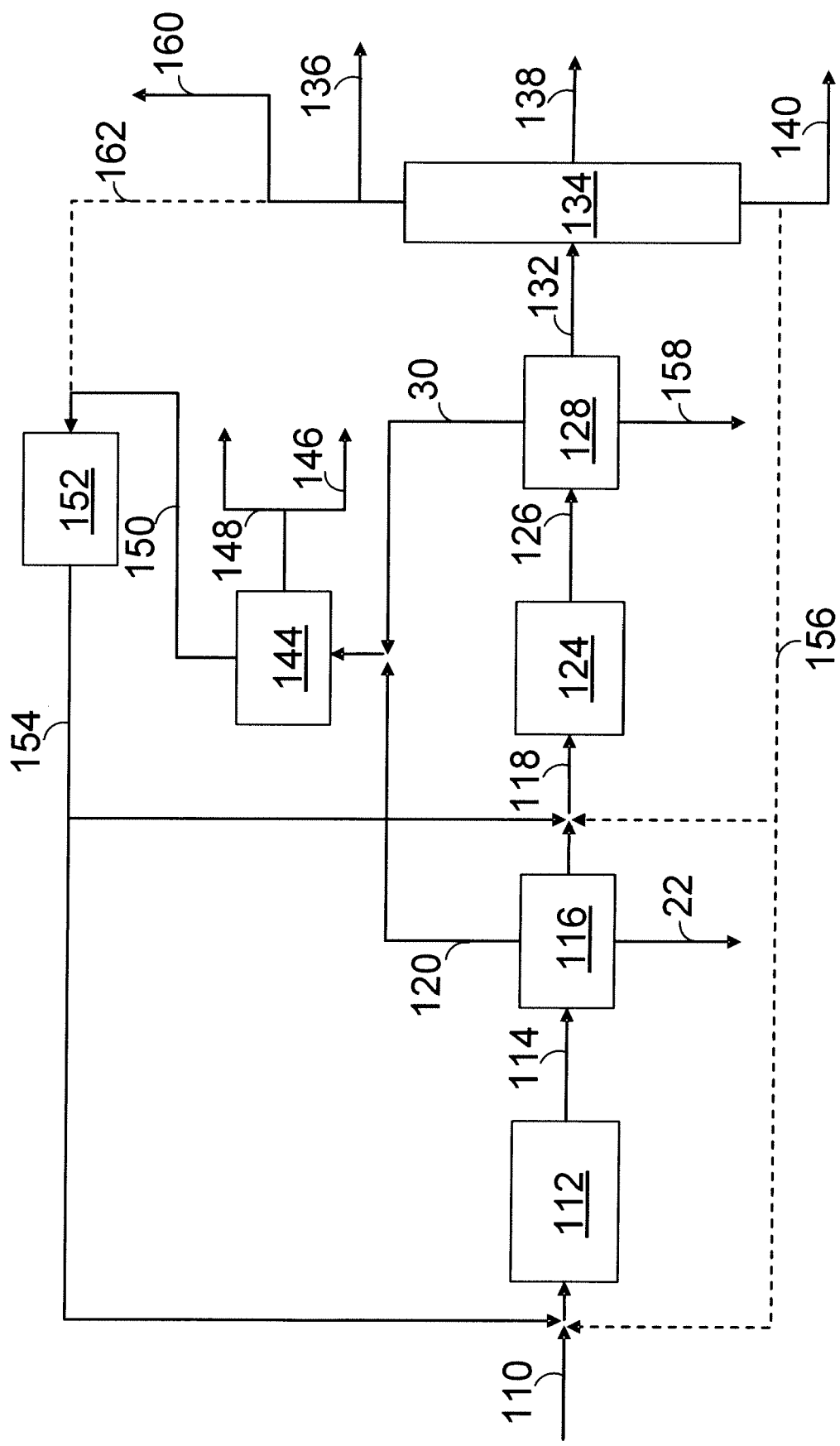
FIG. 2 is a schematic of one embodiment of a process for generating the cyclic rich component.
Figure 3:
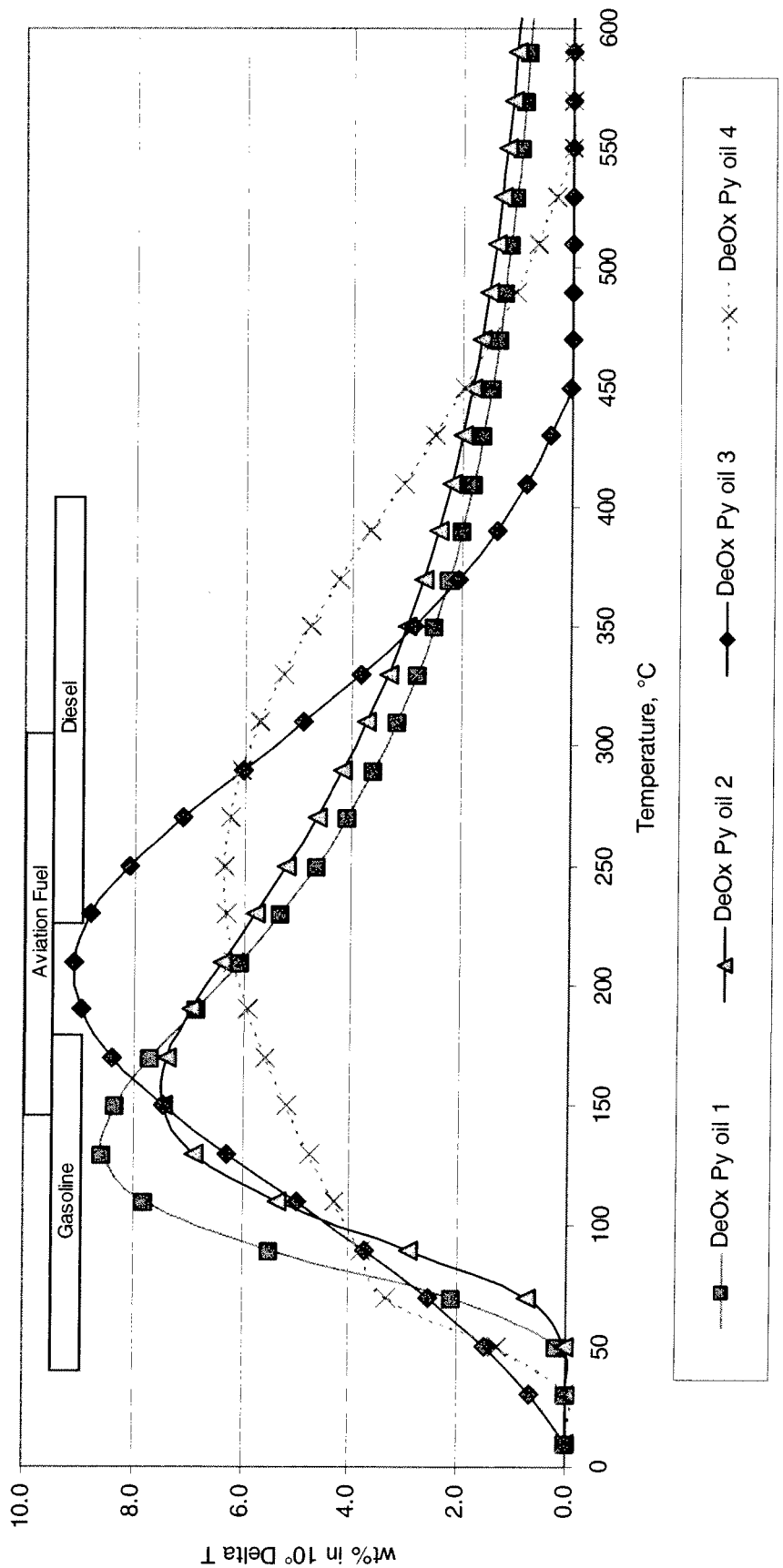
FIG. 3 is a plot of the boiling point distribution of several fully deoxygenated pyrolysis oils suitable as the cyclic component which shows the hydrocarbon products produced have a wide boiling point range with significant fractions in the range for each fuel.

In one embodiment, as shown in FIG. 2, pyrolysis oil 110 is not separated and enters partial deoxygenation zone 112 along with recycle hydrogen stream 154 and optional hydrocarbon recycle 156 where contact with a deoxygenation and hydrogenation catalyst at deoxygenation conditions generates partially deoxygenated pyrolysis oil stream 114. The deoxygenation zone 112 performs catalytic decarboxylation, decarbonylation, and hydrodeoxygenation of oxygen polymers and single oxygenated molecules in the pyrolysis oil by breaking the oxygen linkages, and forming water and $CO_2$ from the oxygen and leaving smaller molecules. For example, the phenylpropyl ether linkages in the pyrolytic lignin will be partially deoxygenated producing some aromatic rings, such as alkylbenzenes and polyalkylbenzenes. Very reactive oxygenates will be deoxygenated as well, including small molecular weight carboxylic acids therefore greatly increasing the thermal stability of the product. Pyrolysis oil components not derived from lignin, including cellulose, hemicellulose, free sugars, may yield products such as acetic acid, furfural, furan, levoglucosan, 5-hydroxymethylfurfural, hydroxyacetaldhyde, formaldehyde, and others such as those described in Mohan, D.; Pittman, C. U.; Steele, P. H. Energy and Fuels, 2006, 20, 848-889. Therefore, pyrolysis oil components not derived from lignin will also be partially or fully deoxygenated with the carbohydrates giving primarily light hydrocarbon fractions and water. The light hydrocarbon fractions may contain hydrocarbons with six or fewer carbon atoms. The reactions of decarbonylation, decarboxylation and hydrodeoxygenation are collectively referred to as deoxygenation reactions. Hydrogenation of olefins also occur in this zone. The catalysts and conditions of partial deoxygenation zone 112 are selected so that the more reactive compounds are deoxygenated. The effluent of partial deoxygenation zone is a partially deoxygenated pyrolysis oil stream 114 that has increased thermal stability as compared to the feed pyrolysis oil.

Partially deoxygenated pyrolysis oil stream 114 is passed to a separation zone 116. Carbon oxides, possibly hydrogen sulfide, and C3 and lighter components are separated and removed in overhead line 120 and a partially deoxygenated product stream 118 is removed from separation zone 116. Separation zone 116 may comprise a separator. Depending upon whether the separator is operated in a hot or cold mode, the water may be removed as a vapor in line 120 (hot separator mode) or as a liquid in line 122 (cold separator mode). Overhead line 120 comprises a large quantity of hydrogen and at least the carbon dioxide from the decarboxylation reaction. The carbon dioxide can be removed from the hydrogen by means well known in the art such as reaction with a hot carbonate solution, pressure swing absorption, etc. Also, absorption with an amine in processes such as described in co-pending U.S. application Ser. No. 12/193,176 and U.S. application Ser. No. 12/193,196, hereby incorporated by reference, may be employed. If desired, essentially pure carbon dioxide can be recovered by regenerating the spent absorption media. Therefore overhead line 120 is passed through one or more scrubbers 144 such as amine scrubbers to remove carbon dioxide in line 46 and hydrogen sulfide in line 148. Depending upon the scrubber technology selected some portion of water may also be retained by the scrubber. The lighter hydrocarbons and gasses, possibly including a portion of water, are conducted via line 150 to steam reforming zone 152. In one embodiment the light hydrocarbon fractions may contain hydrocarbons with six or fewer carbon atoms. After purification, hydrogen generated in steam reforming zone 152 is conducted via line 154 to combine with feedstock 110 and partially deoxygenated product stream 118. The hydrogen may be recycled to combine with the feedstock as shown or may be introduced directly to the reaction zone where hydrogenation primarily occurs and/or to any subsequent reactor beds.

The partially deoxygenated product stream 118 along with recycle hydrogen stream 154 and optional hydrocarbon recycle 156, is passed to a second hydrodeoxygenation zone 124, where the remaining oxygen is removed. Full deoxygenation zone 124 performs catalytic decarboxylation, decarbonylation, and hydrodeoxygenation of the remaining oxygen compounds that are more stable than those reacted in the first stage. Therefore, a more active catalyst and more severe process conditions are employed in full deoxygenation zone 124 as compared to partial deoxygenation zone 112 in order to catalyze full deoxygenation.

Full deoxygenation zone effluent 126 is introduced to phase separator 128. Carbon oxides, possibly hydrogen sulfide and C3 and lighter components are separated and removed in line 30 and liquid hydrocarbons are removed in line 132. Depending upon whether the separator is operated in a hot or cold mode, the water may be removed as a vapor in line 130 (hot separator mode) or as a liquid in line 158 (cold separator mode). The overhead in line 130 comprises a large quantity of hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending U.S. application Ser. No. 12/193,176 and U.S. application Ser. No. 12/193,196, hereby incorporated by reference, may be employed. If desired, essentially pure carbon dioxide can be recovered by regenerating the spent absorption media. Therefore line 130 is passed through one or more scrubbers 144 such as amine scrubbers to remove carbon dioxide in line 146 and hydrogen sulfide in line 148. Depending upon the scrubber technology selected some portion of water may also be retained by the scrubber. The lighter hydrocarbons and gasses, possibly including a portion of water, are conducted via line 150 to steam reforming zone 152. A liquid stream containing hydrocarbons is removed from separator 128 in line 132 and conducted to product fractionation zone 134. Product fractionation zone 134 is operated so that product cut 136 contains the hydrocarbons in a boiling range most beneficial to meeting the gasoline specifications. Product cut 138 is collected for use as aviation fuel or as a blending component of aviation fuel. The lighter materials such as naphtha/gasoline and LPG are removed in fractionation zone overhead stream 160. A portion of stream 160 may be optionally conducted in line 162 to the reforming zone 152. If desired, the naphtha/gasoline and LPG may be further separated into an LPG stream and a naphtha/gasoline stream (not shown).

Hydrocarbons that have a boiling point higher than acceptable for the specification of the aviation fuel are removed in bottoms stream 140. A portion of bottoms stream 140 may be recovered and used as fuel such as, for example, low sulfur heating oil fuel. It is likely that bottoms stream 140 may be acceptable for use as diesel or a diesel blending component. Alternatively, bottoms stream 140 could be upgraded to diesel in a separate process. A portion of bottoms stream 140 is optionally recycled to partial deoxygenation zone 112 and/or full deoxygenation reaction zone 124.

The cyclic rich component may be any of streams 132, 136, 138, 160, or any mixture thereof.

A portion of a hydrocarbon stream may also be cooled down if necessary and used as cool quench liquid between beds of one of the deoxygenation zones, or between the first and the full deoxygenation zone to further control the heat of reaction and provide quench liquid for emergencies. The recycle stream may be introduced to the inlet of one or both of the reaction zones and/or to any subsequent beds or reactors. One benefit of the hydrocarbon recycle is to control the temperature rise across the individual beds. However, as discussed within, the amount of hydrocarbon recycle may be is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation. The fractionation zone may contain more than one fractionation column and thus the locations of the different streams separated may vary from that shown in the figures.

In another embodiment, the pyrolysis oil feed stream is separated to remove at least a portion of the aqueous phase thereby concentrating the amount of pyrolytic lignin left in the pyrolysis oil and generating a pyrolytic lignin-enriched pyrolysis oil. The separation may be accomplished by passing the pyrolysis oil through a phase separator where it is separated into an aqueous phase and a pyrolytic lignin phase and removing at least a portion of the aqueous phase.

In another embodiment, both deoxygenation zones are housed in a single reactor. The deoxygenation zones may be combined through the use of a multifunctional catalyst capable of deoxygenation and hydrogenation or a set of catalysts. Or a reactor housing two separate zones, such as a stacked bed reactor, may be employed. For example, partial deoxygenation and hydrogenation can occur over the first catalyst in a first portion of a reactor, a first zone, while full deoxygenation occurs with a more active catalyst in a second portion the reactor, a second zone. A stacked bed configuration may be advantageous because a less active catalyst in an upper zone will deoxygenate the most reactive oxygen compounds without generating exotherms that can promote the formation of thermal coke.

Hydrogen is needed for the deoxygenation and hydrogenation reactions above, and to be effective, a sufficient quantity of hydrogen must be in solution in the deoxygenation zone to most effectively take part in the catalytic reaction. If hydrogen is not available at the reaction site of the catalyst, the coke forms on the catalyst and deactivates the catalyst. High operating pressures may be used in order to achieve a desired amount of hydrogen in solution and readily available for reaction and to avoid coking reactions on the catalyst. However, higher pressure operations are more costly to build and to operate as compared to their lower pressure counterparts.

The desired amount of hydrogen may be kept in solution at lower pressures by employing a large recycle of hydrocarbon. An added benefit is the control of the temperature in the deoxygenation zone(s) since the deoxygenation reactions are exothermic reactions. However, the range of recycle to feedstock ratios used herein is set based on the need to control the level of hydrogen in the liquid phase and therefore reduce the deactivation rate of the catalyst. The amount of recycle is determined not on temperature control requirements, but instead, based upon hydrogen solubility requirements. Hydrogen has a greater solubility in the hydrocarbon product than it does in the pyrolysis oil feedstock or the portion of the pyrolysis oil feedstock after separation. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. The hydrocarbon recycle may be a portion of the stream in any of lines 132, 140, 138, or 136, or any combination thereof, and the hydrocarbon recycle is directed to deoxygenation zone 112. The figure shows optional hydrocarbon recycle 156 as a portion of diesel boiling point range component 140. However it is understood that in other embodiments portions different streams or combinations of stream such as the product stream 132 or any of fractionation zone streams 138, 136, 160 may be used as the hydrocarbon recycle. Suitable volume ratios of hydrocarbon recycle to pyrolysis oil feedstock is from about 2:1 to about 8:1. In another embodiment the ratio is in the range of about 3:1 to about 6:1 and in yet another embodiment the ratio is in the range of about 4:1 to about 5:1.

Furthermore, the rate of reaction in the deoxygenation zone is increased with the hydrocarbon recycle resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In another embodiment, mixtures or co-feeds of the pyrolysis oil and other renewable feedstocks or petroleum derived hydrocarbons may also be used as the feedstock to the deoxygenation zone. The mixture of the pyrolysis oil and another renewable feedstock or a petroleum derived hydrocarbon is selected to result in greater hydrogen solubility. Other feedstock components which may be used as a co-feed component in combination with the pyrolysis oil from the above listed biomass materials, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. One advantage of using a co-feed component is the transformation of what has been considered to be a waste product from a petroleum based or other process into a valuable co-feed component to the current process.

The partial deoxygenation zone is operated at a pressure from about 3.4 MPa (500 psia) to about 14 MPa (3000 psia), and preferably is operated at a pressure from about 3.4 MPa (500 psia) to about 12 MPa (1800 psia). The partial deoxygenation zone is operated at a temperature from about 200° C. to 400° C. with one embodiment being from about 300° C. to about 375° C. The partial deoxygenation zone is operated at a space velocity from about 0.1 LHSV $h^{-1}$ to 1.5 LHSV $h^{-1}$ based on pyrolysis oil feedstock; this space velocity range does not include any contribution from a recycle stream. In one embodiment the space velocity is from about 0.25 to about 1.0 LHSV $h^{-1}$. The hydrogen to liquid hydrocarbon feed ratio is at about 5000 to 20000 scf/bbl with one embodiment being from about 10,000 to 15,000 scf/bbl. The catalyst in the partial deoxygenation zone is any hydrogenation and hydrotreating catalysts well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Another example includes the catalysts disclosed in U.S. Pat. No. 6,841,085, hereby incorporated by reference.

In the full deoxygenation zone, the conditions are more severe and the catalyst more active compared to that of the partial deoxygenation zone. The catalyst is any hydrocracking catalyst, having a hydrocracking function, that is well known in the art such as nickel or nickel/molybdenum dispersed on a high surface area support. Another example is a combined zeolitic and amorphous silica-alumina catalyst with a metal deposited on the catalyst. The catalyst includes at least one metal selected from nickel (Ni), chromium (Cr), molybdenum (Mo), tungsten (W), cobalt (Co), rhodium (Rh), iridium (Ir), ruthenium (Ru), and rhenium (Re). In one embodiment, the catalyst includes a mixture of the metals Ni and Mo on the catalyst. The catalyst is preferably a large pore catalyst that provides sufficient pore size for allowing larger molecules into the pores for cracking to smaller molecular constituents. The metal content deposited on the catalysts used are deposited in amounts ranging from 0.1 wt. % to 20 wt. %, with specific embodiments having values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with example combinations being Ni with W, and Ni with Mo. Zeolites used for the catalysts include, but are not limited to, beta zeolite, Y-zeolite, MFI type zeolites, mordenite, silicalite, SM3, and faujasite. The catalysts are capable of catalyzing decarboxylation, decarbonylation and/or hydrodeoxygenation of the feedstock to remove oxygen as well as hydrogenation to saturate olefins. Cracking may also occur. Decarboxylation, decarbonylation, and hydrodeoxygenation are herein collectively referred to as deoxygenation reactions.

The full deoxygenation zone conditions include a relatively low pressure of about 6890 kPa (1000 psia) to about 13,790 kPa (2000 psia), a temperature of about 300° C. to about 500° C. and a liquid hourly space velocity of about 0.1 to about 3 $hr^{-1}$ based on fresh feed not recycle. In another embodiment the deoxygenation conditions include the same pressure of about 6890 kPa (1000 psia) to about 6895 kPa (1700 psia), a temperature of about 350° C. to about 450° C. and a liquid hourly space velocity of about 0.15 to about 0.40 $hr^{-1}$. It is envisioned and is within the scope of this invention that all the reactions are occurring simultaneously within a zone.

Example of Cyclic Rich Component

A whole mixed-wood pyrolysis oil feedstock was fed once-through a fixed bed reactor loaded with a hydrotreating catalyst at the conditions specified for partial deoxygenation zone (Zone 1) in Table 2 below. The effluent oil was isolated after separation of water generated in the reaction. The properties of the effluent oil from the partial deoxygenation zone are also shown in Table 2. The partially deoxygenated effluent oil from the partial deoxygenation zone was then fed to a full deoxygenation zone and contacted with a second catalyst at the elevated process conditions shown in Table 2. This second catalyst was a sulfided nickel and molybdenum on alumina catalyst produced by UOP. The overall volumetric yield of hydrocarbon that was isolated from the effluent of the full deoxygenation zone was about 51 vol % of the initial whole mixed-wood pyrolysis oil feedstock.

A whole pyrolysis oil feedstock produced from corn stover was fed once-through a fixed bed reactor loaded with a hydrotreating catalyst at the conditions specified for the partial deoxygenation zone (Zone 1) in Table 3 below. The effluent oil was isolated after separation of water generated in the reaction. The properties of the effluent oil from the partial deoxygenation zone are also shown in Table 3. The partially deoxygenated effluent from the partial deoxygenation zone was then fed over a second catalyst in a full oxygenation zone at the elevated process conditions shown. This second catalyst was a sulfided nickel molybdenum on alumina catalyst produced by UOP. The overall volumetric yield of hydrocarbon isolated from the effluent of the full deoxygenation zone was about 67 vol % of the initial whole pyrolysis oil feedstock produced from corn stover.

The third example again shows the complete deoxygenation of a whole pyrolysis oil produced from corn stover. The pyrolysis oil was fed once-through over a stacked fixed bed reactor. The upper zone of the reactor, the partial deoxygenation zone, was loaded with a milder hydrotreating catalyst run 250° C. as shown in Table 4. The bottom zone of the reactor, the full deoxygenation zone, was loaded a sulfided nickel and molybdenum on alumina catalyst produced by UOP and kept at 400° C. The other process variables are shown in Table 4. This example shows that a single reactor with stacked catalyst beds is capable of full deoxygenation to produce a hydrocarbon product.

TABLE 2

| Zone | Pressure kPa g (psig) | Temp. (C.) | LHSV (h-1) | H2/oil (scf/bbl) | Oil yield (vol %) | O (wt %) | H$_2$O | TAN (mg KOH/g oil) |
|---|---|---|---|---|---|---|---|---|
| 1: Partial Deoxygenation (Hydrotreating) | 13,858 (2010) | 315 | 0.25 | 18000 | 70% | 10.9% | 2.4 wt % | 51 |
| 2: Full Deoxygenation (Hydrocracking) | 10,411 (1510) | 405 | 0.25 | 14000 | 73% | 0.4% | 113 ppm | 2.6 |

TABLE 3

| Zone | Pressure kPa g (psig) | Temp. (C.) | LHSV (h-1) | H2/oil (scf/bbl) | Oil yield (vol %) | Effluent Properties | | |
|---|---|---|---|---|---|---|---|---|
| | | | | | | O (wt %) | H$_2$O | TAN (mg KOH/g oil) |
| 1: Partial Deoxygenation (Hydrotreating) | 13,445 (1950) | 340 | 0.2 | 14000 | 79% | 12.8% | 3.2% | 47 |
| 2: Full Deoxygenation (Hydrocracking) | 10,514 (1525) | 407 | 0.19 | 13700 | 85% | 0.4% | 450 ppm | 1.6 |

TABLE 4

| Zone | Pressure kPa g (psig) | Temp. (C.) | LHSV (h-1) | H2/oil (scf/bbl) | Oil yield (vol %) | Effluent Properties | | |
|---|---|---|---|---|---|---|---|---|
| | | | | | | O (wt %) | H$_2$O | TAN (mg KOH/g oil) |
| 1. Upper Zone of Reactor (Partial Deoxygenation) | 13,445 (1950) | 250 | 0.14 | 10500 | 0.25 | 0.0035 | 300 ppm | 1.6 |
| 2: Bottom Zone of Reactor (Full Deoxygenation) | | 400 | | | | | | |

Table 5 shows the typical distribution of hydrocarbon classes produced after full deoxygenation of whole pyrolysis oil. The final distribution depends on the feedstock processed, catalyst choice, and process conditions. The distribution of the final product from example 2 above is shown in the "Example 2 Product" column. This represents a hydrocarbon product produced from solid corn stover pyrolysis oil processed as described in Table 3.

TABLE 5

| Hydrocarbon class | Min (wt %) | Max (wt %) | Example 2 Product |
|---|---|---|---|
| n-paraffins | 5 | 10 | 8.3 |
| isoparaffins | 15 | 25 | 15.5 |
| olefins | 0.1 | 1 | 0.2 |
| naphthene | 35 | 55 | 52.4 |
| aromatic | 10 | 35 | 23.5 |
| oxygenate | 0.1 | 0.8 | 0.1 |

The boiling point distribution of several fully deoxygenated pyrolysis oils is shown in FIG. 4. As shown the hydrocarbon product produced has a wide boiling point range with significant fractions in the range for each fuel. Some heavier components are also present that fall outside the range of gasoline, aviation fuel, and diesel. These heavy components could be recycled back into the second zone for further hydrocracking or be isolated for other industrial uses.

Blending the Paraffin Rich Component and the Cyclic Rich Component

At least one paraffin rich component and at least one cyclic rich component are blended to produce a target fuel. The target fuel may be in the gasoline boiling point range, the diesel boiling point range, in the aviation boiling point range, or multiple fuels may be produced in any combination of the boiling point ranges. Other components or additives may be incorporated into the blending so that the target fuel meets additional specifications. Many fuels are defined by a set of physical and chemical specifications. For a blend to be called a certain type of fuel, it must meet the required specifications. If a first component does not meet the desired specifications, one or more additional components are blended with the first component so that the final blended product meets the desired specifications. For example, the paraffin rich component obtained above may not meet a particular specification of a target fuel. Blending of the paraffin rich component with the cyclic component would enable the blended fuel to meet at least some of the specifications. The relative amounts of the components being blended is determined by the specification to be met and the influence each component has on the specification. As an example, the paraffin rich component may not meet the density requirement for specific types of jet fuel such as JP-8. But when blended with a cyclic rich component, the blended fuel now meets the density requirements. Blending must be conducted with accounting for all the specifications to be met. For example, the blending of the paraffin rich component and the cyclic rich component to meet the density requirements of JP-8, must also take into consideration meeting the cloud point requirement, flash point requirement, and other requirements for the target fuel. Models and algorithms may be employed to assist in determine the relative amounts of the components being blended.

A particular advantage of blending the paraffin rich component and the cyclic rich component is that the resulting target fuel comprises at least two components that were produced from renewable feedstocks. If the target fuel can be produced through the blending of these two components, then the target fuel would be wholly derived from renewable sources. Another advantage of some embodiments of the invention is the opportunity to produce the paraffin rich component and the cyclic rich component from the same renewable source. For example, corn or soy beans may be processed to produce vegetable oil which is the feedstock to the process which produces the paraffin rich component. Biomass is a byproduct of the corn or soy bean processing to produce vegetable oil. This biomass may be pyrolized to generate the pyrolysis oil that is the feedstock to the process which produces the cyclic rich component. Therefore, a single renewable source, such as the corn or soybeans, provide the feedstocks to both of the processes, one generating the paraffin rich component and one generating the cyclic rich component. Corn and soybeans are merely illustrative of the concept, and the single renewable source may be any of those sources which provide the renewable feedstocks discussed above.

Another possible advantage includes integrating the process which produces the paraffin rich component and the process which produces the cyclic rich component. One point of integration is the product fractionation zone. It is envisioned that the product fractionation zone of the process to generate the paraffin rich component and the fractionation zone of the process to generate the cyclic rich component may be integrated. In this embodiment, the blending of the two components occurs prior to the fractionation of the combined product streams.

Table 6 shows one example of a benefit of blending renewable-derived feedstocks as described herein. Freeze point, flash point and density are key specifications for aviation fuels. Line 2 of Table 6 shows that the paraffin rich component produced by hydrodeoxygenation, hydroisomerization and partial hydrocracking of soybean oil gives, upon fractionation, a fuel product that meets aviation fuel specification for freeze point and flash point but not for density (MTL-DTL-83133). Similarly, hydrocarbon derived by hydrodeoxygenation of pyrolysis oil from corn stover (Line 3 of Table 6) or wood (Line 4 of Table 6) do not meet density specification. Blends of the soybean oil-derived paraffin component with the cyclic rich component derived from pyrolysis oil, however, do meet the density specification (Lines 5 and 6 of Table 6). Specific blends are prepared according to the properties of the individual components and the properties of the desired final hydrocarbon fuel. Thus a clear benefit in fuel quality by blending renewable-derived hydrocarbon components has been demonstrated.

TABLE 6

Aviation Fuel Properties from Renewable-Derived Feedstocks and Blends

| | Sample | Vol % pyrolysis oil hydrocarbon | Freeze Point, °C. (max) | Flash Point, °C. (min) | Density, g/cc |
|---|---|---|---|---|---|
| 1 | JP-8 Specifications | | −47 | 38 | 0.775-0.840 |
| 2 | Soybean Oil Paraffin | 0% | −52.6 | 53 | 0.759 |
| 3 | Corn Stover-derived Pyrolysis Oil Hydrocarbon | 100 | −53 | n/d | 0.878 |
| 4 | Wood-derived Pyrolysis Oil Hydrocarbon | 100 | −85 | n/d | 0.852 |
| 5 | Corn Stover/Soy Oil-derived Hydrocarbon Blend | 25 | −56 | 49 | 0.790 |
| 6 | Wood/Soy Oil-derived Hydrocarbon Blend | 25 | −54 | 54 | 0.782 |

The invention claimed is:

1. A process for producing a blended fuel from renewable feedstocks comprising;
 a) generating at least one paraffin rich component from a first renewable feedstock comprising at least glycerides, the steps comprising:
  i) treating the glycerides and free fatty acids in the renewable feedstock in a first reaction zone by hydrogenating and deoxygenating the glycerides using a catalyst at reaction conditions in the presence of hydrogen to provide a first reaction zone product stream comprising hydrogen, water, carbon dioxide, and a hydrocarbon fraction comprising paraffins in the diesel boiling point range;
  ii) introducing at least the hydrocarbon fraction comprising paraffins to a second reaction zone to contact an isomerization and selective hydrocracking catalyst at isomerization and selective cracking conditions to selectively hydrocrack at least a portion of the paraffins and to isomerize at least a portion of the paraffins and generate a branched paraffin-enriched stream;
  iii) cooling the branched paraffin-enriched stream and the gaseous stream and separating a gaseous component comprising at least hydrogen and carbon dioxide from the paraffin rich component and a water component;
 b) generating a cyclic rich component from a second renewable feedstock comprising pyrolysis oil, the steps comprising:
  i) partially deoxygenating the pyrolysis oil in a first pyrolysis oil deoxygenation zone by contacting the pyrolysis oil with a first deoxygenation and hydrogenation catalyst in the presence of hydrogen at deoxygenation conditions to produce a partially deoxygenated pyrolysis oil stream comprising water, gasses, light ends, and hydrocarbons;
  ii) passing the partially deoxygenated pyrolysis oil stream to a separation zone to separate a water, gasses, and light ends stream from a remainder stream wherein the light ends of the water, gasses, and light ends stream are processed other than blending with the cyclic rich component of step b) iii);
  iii) passing the remainder stream to a second pyrolysis oil deoxygenation zone and deoxygenating the remainder stream by contacting with a second deoxygenation catalyst under deoxygenation conditions, to generate a cyclic rich component comprising cyclic hydrocarbon compounds useful as a fuel or a fuel blending component in the boiling point ranges of gasoline, aviation, diesel, and any combination thereof; and
 c) blending at least a portion of the paraffin rich component and at least a portion of the cyclic rich component to form at least one blended fuel selected from the group consisting of a gasoline boiling point range blended fuel, a diesel boiling point range blended fuel, an aviation boiling point range blended fuel, or any combination thereof.

2. The process of claim 1 further comprising separating the paraffin rich component into a gasoline boiling point range paraffin rich component, a diesel boiling point range paraffin rich component, and an aviation boiling point range paraffin rich component and separating the cyclic rich component into a gasoline boiling point range cyclic rich component, a diesel boiling point range cyclic rich component, and an aviation boiling point range cyclic rich component.

3. The process of claim 1 wherein the blended fuel produced in claim 1(c) is a mixture of gasoline boiling point range blended fuel, diesel boiling point range blended fuel, and aviation boiling point range blended fuel, said process further comprising separating the blended fuel produced in claim 1(c) in a fractionation zone to separate the gasoline boiling point range blended fuel, the diesel boiling point range blended fuel, and the aviation boiling point range blended fuel.

4. The process of claim 1 further comprising selectively separating, in a hot high pressure hydrogen stripper, a gaseous stream comprising at least a portion of the hydrogen, water, and carbon oxides from the first reaction zone product stream to generate the hydrocarbon fraction comprising paraffins.

5. The process of claim 4 further comprising recycling, to a rectification zone in the hot high pressure hydrogen stripper, a portion of the paraffin rich component.

6. The process of claim 4 wherein the branched paraffin-enriched stream further comprises hydrogen and at least a portion of the hydrogen is separated from the branched paraffin-enriched stream and recycled to the hot high pressure hydrogen stripper.

7. The process of claim 1 wherein the branched paraffin-enriched stream comprises paraffins in the diesel, gasoline, and aviation boiling point ranges.

8. The process of claim 1 wherein the first and second renewable feedstocks are derived from a single renewable source.

9. The process of claim 1 further comprising recycling a portion of the hydrocarbon fraction comprising paraffins to the first reaction zone at a volume ratio of recycle to renewable feedstock in the range of about 2:1 to about 8:1.

10. The process of claim 1 further comprising recycling a portion of the cyclic rich component to the partial deoxygenation zone, the full deoxygenation zone, or both wherein the volume ratio of recycle to feed to the deoxygenation zone is in the range of about 2:1 to about 8:1.

11. The process of claim 1 further comprising recycling at least a portion of the branched paraffin-enriched stream to the second reaction zone.

12. The process of claim 1 further comprising pre-treating the first renewable feedstock, the second renewable feedstock, or both in one or more pretreatment zones at pretreatment conditions to remove at least a portion of contaminants in the feedstocks.

13. The process of claim 1 wherein the first and second reaction zones are operated at conditions including a temperature of about 40° C. to about 400° C. and a pressure of about 689 kPa absolute (100 psia) to about 13,790 kPa absolute (2000 psia); the partial deoxygenation zone is operated at a pressure in the range from 3.4 MPa (500 psia) to about 20.6 MPa (3000 psia) and a temperature in the range of about 200° C. to about 400° C.; and the full deoxygenation zone is operated at a pressure between about 689 kPa (100 psia) to about 13.8 MPa (2000 psia) and at a temperature of about 300° C. to about 500° C.

14. The process of claim 4 wherein the hot high pressure hydrogen stripper is operated at a temperature of about 40° C. to about 300° C. and a pressure of about 689 kPa absolute (100 psia) to about 13,790 kPa absolute (2000 psia).

15. The process of claim 4 wherein the hot high pressure hydrogen stripper is operated at a pressure that is within 1034 kPa absolute (150 psia) that of the first reaction zone and the second reaction zone is operated at a pressure at least about 345 kPa absolute (50 psia) greater than that of the first reaction zone.

16. The process of claim 1 wherein at least one of the renewable feedstocks is in a mixture or co-feed with a petroleum hydrocarbon feedstock, and the petroleum hydrocarbon feedstock is co-processed with the renewable feedstock.

17. A diesel boiling point range blended fuel, an aviation boiling point range blended fuel, and a gasoline boiling point range blended fuel as produced by the process of claim 1.

18. The process of claim 1 further comprising mixing one or more additives to at least one of the diesel boiling point range blended fuel, the aviation boiling point range blended fuel, and the gasoline boiling point range blended fuel.

19. A blended fuel meeting the specification of MTL-DTL-83133 wherein at least one component of the blended fuel is the aviation boiling point range blended fuel produced by the process of claim 1.

20. A blended fuel comprising the gasoline boiling point range blended fuel of claim 1 and a component produced from processing a petroleum feedstock.

21. A blended fuel comprising the aviation boiling point range blended fuel of claim 1 and a component produced from processing a petroleum feedstock.

22. A blended fuel comprising the diesel boiling point range blended fuel of claim 1 and a component produced from processing a petroleum feedstock.

23. A process for producing a blended fuel from renewable feedstocks comprising;
   a) generating at least one paraffin rich component from a first renewable feedstock comprising glycerides and free fatty acids, the steps comprising:
      i) treating the glycerides and free fatty acids in the renewable feedstock in a first reaction zone by hydrogenating and deoxygenating the glycerides and free fatty acids using a catalyst at reaction conditions in the presence of hydrogen to provide a first reaction zone product stream comprising hydrogen, water, carbon dioxide, and a hydrocarbon fraction comprising paraffins in the diesel boiling point range;
      ii) introducing at least the hydrocarbon fraction comprising paraffins to a second reaction zone to contact an isomerization and selective hydrocracking catalyst at isomerization and selective cracking conditions to selectively hydrocrack at least a portion of the paraffins and to isomerize at least a portion of the paraffins and generate a branched paraffin-enriched stream;
      iii) cooling the branched paraffin-enriched stream and the gaseous stream and separating a gaseous component comprising at least hydrogen and carbon dioxide from the paraffin rich component and a water component;
   b) generating a cyclic rich component from a second renewable feedstock comprising pyrolysis oil, the steps comprising:
      i) deoxygenating the pyrolysis oil in a deoxygenation zone by contacting, in the presence of hydrogen at deoxygenation conditions, the pyrolysis oil with a first deoxygenation and hydrogenation catalyst in a first portion of the deoxygenation zone with a second deoxygenation catalyst in a second portion of the deoxygenation zone to produce a deoxygenated pyrolysis oil stream comprising water, gasses, light ends, and cyclic compounds;
      ii) passing the deoxygenated pyrolysis oil stream to a separation zone to separate a water, gasses, and light ends stream from a cyclic rich component comprising cyclic compounds useful as a fuel or a fuel blending component in the boiling point ranges of gasoline, aviation, diesel, and any combination thereof; and c) blending at least a portion of the paraffin rich component and at least a portion of the cyclic rich component to form at least one blended fuel selected from the group consisting of a gasoline boiling point range blended fuel, a diesel boiling point range blended fuel, an aviation boiling point range blended fuel, or any combination thereof.

24. The process of claim 23 further comprising selectively separating, in a hot high pressure hydrogen stripper, a gaseous stream comprising at least a portion of the hydrogen, water, and carbon oxides from the first reaction zone product stream to generate the hydrocarbon fraction comprising paraffins.

25. A process for producing a blended fuel from renewable feedstocks comprising;
   a) generating at least one paraffin rich component from a first renewable feedstock comprising glycerides and free fatty acids, the steps comprising:
      i) treating the glycerides and free fatty acids in the renewable feedstock in a first reaction zone by hydrogenating and deoxygenating the glycerides and free fatty acids using a catalyst at reaction conditions in the presence of hydrogen to provide a first reaction zone product stream comprising hydrogen, water, carbon dioxide, and a hydrocarbon fraction comprising paraffins in the diesel boiling point range;
      ii) introducing hydrocarbon fraction comprising paraffins to a second reaction zone to contact an isomerization and selective hydrocracking catalyst at isomerization and selective cracking conditions to selectively hydrocrack at least a portion of the paraffins and to isomerize at least a portion of the paraffins and generate a branched paraffin-enriched stream;
      iii) cooling the branched paraffin-enriched stream and the gaseous stream and separating a gaseous component comprising at least hydrogen and carbon dioxide from the paraffin rich component and a water component;
   b) generating a cyclic rich component from a second renewable feedstock comprising pyrolysis oil, the steps comprising:
      i) deoxygenating the pyrolysis oil in a deoxygenation zone by contacting, in the presence of hydrogen at deoxygenation conditions, the pyrolysis oil with a mixture of a first deoxygenation catalyst and a second deoxygenation catalyst to produce a deoxygenated pyrolysis oil stream comprising water, gasses, light ends, and cyclic compounds wherein the first deoxygenation catalyst is a hydrotreating catalyst and the second deoxygenation catalyst is a hydrocracking catalyst;
      ii) passing the deoxygenated pyrolysis oil stream to a separation zone to separate a water, gasses, and light ends stream from a cyclic rich component comprising cyclic compounds useful as a fuel or a fuel blending component in the boiling point ranges of gasoline, aviation, diesel, and any combination thereof; and
   c) blending at least a portion of the paraffin rich component and at least a portion of the cyclic rich component to form at least one blended fuel selected from the group consisting of a gasoline boiling point range blended fuel, a diesel boiling point range blended fuel, an aviation boiling point range blended fuel, or any combination thereof.

26. The process of claim 25 further comprising selectively separating, in a hot high pressure hydrogen stripper, a gaseous stream comprising at least a portion of the hydrogen, water, and carbon oxides from the first reaction zone product stream to generate the hydrocarbon fraction comprising paraffins.

* * * * *